United States Patent [19]

Maruyama et al.

[11] Patent Number: 4,617,239
[45] Date of Patent: Oct. 14, 1986

[54] PAPER COATING AGENT

[75] Inventors: Hitoshi Maruyama; Koichi Kajitani; Makoto Shiraishi, all of Kurashiki, Japan

[73] Assignee: Kuraray Co., Ltd., Kurashiki, Japan

[21] Appl. No.: 645,708

[22] Filed: Aug. 30, 1984

Related U.S. Application Data

[62] Division of Ser. No. 429,231, Sep. 30, 1982, abandoned.

[30] Foreign Application Priority Data

Oct. 5, 1981 [JP] Japan ............................ 56-158974
Oct. 7, 1981 [JP] Japan ............................ 56-160658
Mar. 23, 1982 [JP] Japan ............................ 57-46676

[51] Int. Cl.$^4$ ............................................... B32B 9/06
[52] U.S. Cl. .................................. 428/452; 428/537.5; 428/511
[58] Field of Search ............... 428/452, 537.5, 511

[56] References Cited

U.S. PATENT DOCUMENTS 3,408,420 10/1968 Wiggill ............................ 260/827
4,219,591 8/1980 Buning et al. .................. 427/387
4,276,389 6/1981 Wieder et al. .................. 525/61

Primary Examiner—Paul R. Michl
Assistant Examiner—Alex H. Walker
Attorney, Agent, or Firm—Oblon, Fisher, Spivak, McClelland & Maier

[57] ABSTRACT

This invention relates to a method of coating paper to improve the surface strength and printability thereof comprising applying to the paper a silicon-containing modified polyvinyl alcohol agent or its saponification product. This method gives outstanding results for printing purposes when coated onto paper objects. This invention also relates to a paper having a silicon-containing polyvinyl alcohol agents coated thereon.

14 Claims, No Drawings

PAPER COATING AGENT

This is a division of application Ser. No. 429,231, filed Sept. 30, 1982, now abandoned.

BACKGROUND OF THE INVENTION

1. Field of the Invention

The present invention relates to a paper coating agent, and more particularly, it relates to a paper coating agent that imparts to paper water resistance, printability, surface strength, and barrier properties that make paper less permeable to air, oil, and organic solvents.

2. Description of the Prior Art

Heretofore, polyvinyl alcohol (abbreviated as PVA hereinafter) has been widely used as a clear coating agent to improve the surface strength, smoothness, gloss, and barrier properties of paper and as a binder for pigment coating compounds. It is also known that PVA is far superior to any other sizing agents in the film forming property and strength.

Recently, the surface strength of paper has tended to decrease as Asian tropical wood has come to account for a greater percentage in pulpwood and the printing speed has tended to increase. Under these conditions, there has arisen a demand for PVA that improves the surface strength and other properties of paper. In addition, in view of the remarkable development of barrier paper, there is a demand for PVA that imparts to paper improved barrier properties. Conventional PVA, however, does not meet completely these requirements. In order to overcome the disadvantage of conventional PVA, there was proposed in Japanese Patent Publication No. 39,442/1977 and Japanese Patent Laid-Open No. 20,698/1981 the use of PVA with a lactone ring or a carboxyl group introduced into the molecule. The proposed PVA is not effective in practical use. Thus the development of new PVA that meets the above-mentioned requirements has been expected.

New PVA is also required for making improved offset printing plates. Offset printing plates commonly used for office printing are made up of a substrate of wet-strength paper, an image forming layer, and an intermediate layer placed between them. The intermediate layer is provided to improve the durability of the plate. The image forming layer and intermediate layer should have a sufficient affinity for water to repel ink during printing as well as a sufficient resistance to damping water which is supplied repeatedly during printing. In order to provide both affinity for water and resistance to water, the conventional image forming layer and intermediate layer have been incorporated with a water-soluble polymeric substance such as PVA, casein, and starch, or a crosslink reaction product of a water-soluble polymer and an amino resin condensate. The crosslinking reaction, however, has a disadvantage. If the crosslinking reaction is allowed to take place before the compound is applied to the substrate, the compound becomes excessively viscous due to gellation, making coating impossible. On the other hand, the crosslinking reaction during or after the coating process requires such a high temperature and long time that the productivity is reduced to a great extent.

The above-mentioned system composed of water-soluble resin and crosslinking agent loses the balance of water affinity and water resistance when the mixing ratio of the two components varies or the crosslinking conditions vary. Thus, the offset printing plates prepared from it tend to vary in uniformity.

SUMMARY OF THE INVENTION

It is an object of this invention to provide a paper coating agent composed of modified polyvinyl alcohol containing silicon in the molecule.

On contact with paper, the coating agent of this invention becomes viscous and gelled, forming a water-resistant film on the surface of paper. The film thus formed minimizes the penetration of the coating compound into paper and improves the surface strength and printability of paper.

The coating agent of this invention can also be applied to wet-strength paper to prepare offset printing plates which are superior in both water affinity and water resistance under normal conditions without using special curing that requires a high temperature and a long time.

DESCRIPTION OF SPECIFIC EMBODIMENTS

The silicon-containing modified PVA used in this invention may be any one which contains silicon in the molecule. Preferably, it should have such a structure that the substituent groups connecting to silicon are partly a hydroxyl group or an alkali salt of hydroxyl group.

Such modified PVA may be produced by (1) introducing silicon into the molecule by post-modification with a silylating agent or introducing silicon into modified polyvinyl acetate having functional groups such as carboxyl group or hydroxyl group that react with a silylating agent by post-modification with a silylating agent and subsequently saponifying the modified polyvinyl acetate; or (2) saponifying a copolymer of vinyl ester and silicon-containing olefinic unsaturated monomer.

The post-modification of PVA with a silylating agent may be accomplished by dissolving a silylating agent in an organic solvent such as benzene, toluene, xylene, hexane, heptane, ether, and acetone which is inert to the silylating agent, and suspending PVA powder or modified polyvinyl acetate powder in the solution with stirring. Silylation is performed at a temperature from normal temperature to the boiling point of the silylating agent, and the saponification of vinyl acetate units is accomplished by the use of an alkali catalyst.

The silylating agent for post-modification should preferably be a compound having two or more hydrolyzable functional groups. Examples of such a compound include organohalogenosilane such as dimethyldichlorosilane, methyltrichlorosilane, vinyl trichlorosilane, and diphenyldichlorosilane; organosilicon ester such as dimethylacetoxysilane; organoalkoxysilane such as dimethyldimethoxysilane; organosilanol such as diethylsilanediol; and aminoalkylsilane such as N-aminoethylaminopropyltrimethoxysilane.

The ratio of introduction of silylating agent, i.e. the ratio of modification, may be adjusted properly by the quantity of the silylating agent and the reaction time. Usually, it is adjusted in the range of 0.01 to 10 mol%.

The degree of polymerization and saponification of the silicon-containing modified PVA to be produced may be properly adjusted by selecting the degree of polymerization and saponification reaction of PVA or modified polyvinyl acetate.

According to the process for saponifying a copolymer of vinyl ester and silicon-containing olefinic unsaturated monomer, the silicon-containing modified PVA is produced as follows: At first, a vinyl ester and silicon-containing olefinic unsaturated monomer are copolymerized by the use of a radical initiator in the presence or absence of solvent such as alcohol, and then the resulting copolymer is saponified by adding an alkali or acid catalyst to the alcohol solution of the copolymer.

The vinyl ester used for this process includes, for example, vinyl acetate, vinyl propionate, and vinyl formate. Preferable among them from an economical standpoint is vinyl acetate.

The silicon-containing olefinic unsaturated monomer used in this process includes vinylsilanes represented by the formula (I) and (meth)acrylamide-alkylsilanes represented by the formula (II).

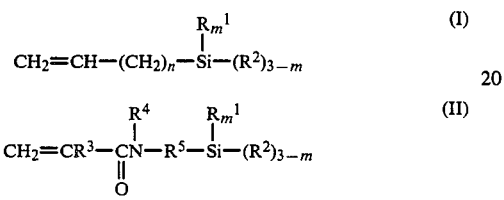

(where n is 0 to 4; m is 0 to 2; $R^1$ is a lower alkyl group such as methyl and ethyl having 1 to 5 carbon atoms, an aryl group having 6 to 18 carbon atoms, or a lower alkyl group of 1 to 5 carbon atoms having an aryl group of 6 to 18 carbon atoms; $R^2$ is an alkoxyl group having 1 to 40, preferably 1 to 18, carbon atoms, an acyloxy group having 2 to 40, preferably 2 to 18, carbon atoms; (the alkoxyl group and acyloxyl group may have a substituent group containing an oxygen or nitrogen atom); $R^3$ is hydrogen or a methyl group; $R^4$ is hydrogen or a lower alkyl group having 1 to 5 carbon atoms; and $R^5$ is an alkylene group having 1 to 5 carbon atoms or a divalent organic residue in which carbon atoms are connected with each other by an oxygen or nitrogen atom. Where two groups represented by $R^1$ are present in the same monomer, they may be the same or different; and where two groups represented by $R^2$ are present in the same monomer, they may be the same or different.)

Examples of the vinylsilanes represented by the formula (I) include vinyltrimethoxysilane, vinyltriethoxysilane, vinyltris($\beta$-methoxyethoxy)silane, vinyltriacetoxysilane, allyltrimethoxysilane, allyltriacetoxysilane, vinylmethyldimethoxysilane, vinyldimethylmethoxysilane, vinylmethyldiethoxysilane, vinyldimethoxyethoxysilane, vinylmethyldiacetoxysilane, vinyldimethylacetoxysilane, vinylisobutyldimethoxysilane, vinyltriisopropoxysilane, vinyltri-n-butoxysilane, vinyltrisecbutoxysilane, vinyltrihexyloxysilane, vinylmethoxydihexyloxysilane, vinyldimethoxyoctyloxysilane, vinylmethoxydioctyloxysilane, vinyltrioctyloxysilane, vinylmethoxydilauryloxysilane, vinyldimethoxylauryloxysilane, vinylmethoxydioleyoxysilane, vinyldimethoxyoleyloxysilane, and polyethyleneglycol-modified vinylsilane represented by the formula

(where $R^1$ and m are as defined above, and x is 1 to 20.)

Examples of the (meth)acrylamide-alkylsilane represented by the formula (II) include:

(meth)acrylamide-linear or branched alkyltrialkoxysilanes (where R is hydrogen or a methyl group) such as 3-(meth)acrylamide-propyltrimethoxysilane,

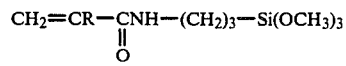

3-(meth)acrylamide-propyltriethoxysilane,

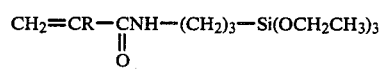

3-(meth)acrylamide-propyltri($\beta$-methoxyethoxy)silane,

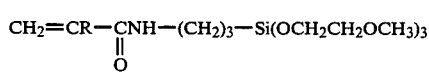

3-(meth)acrylamide-propyltri(N-methylaminoethoxy)-silane,

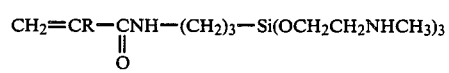

2-(meth)acrylamide-ethyltrimethoxysilane,

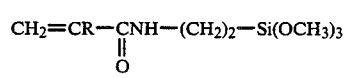

1-(meth)acrylamide-methyltrimethoxysilane,

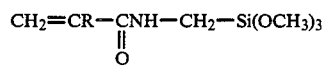

2-(meth)acrylamide-2-methylpropyltrimethoxysilane, and

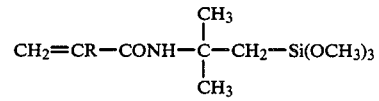

2-(meth)acrylamide-isopropyltrimethoxysilane;

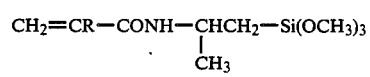

(meth)acrylamide-nitrogen-containing or oxygen-containing alkyltrialkoxysilanes (where R is hydrogen or a methyl group) such as N-(2-(meth)acrylamide-ethyl)-aminopropyltrimethoxysilane, and

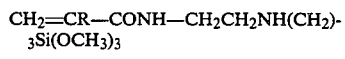

(3-(meth)acrylamide-propyl)-oxypropyltrimethoxysilane;

$$CH_2=CR-CONH-(CH_2)_3-O-(CH_2)_3Si(OCH_3)_3$$

acrylamide-alkyltriacyloxysilane (where R is hydrogen or a methyl group) such as
3-(meth)acrylamide-propyltriacetoxysilane, $$CH_2=CR-CONH(CH_2)_3-Si(OCOCH_3)_3$$

2-(meth)acrylamide-ethyltriacetoxysilane, $$CH_2=CR-CONH(CH_2)_2-Si(OCOCH_3)_3$$

4-(meth)acrylamide-butyltriacetoxysilane, $$CH_2=CR-CONH(CH_2)_4-Si(OCOCH_3)_3$$

3-(meth)acrylamide-propyltripropionyloxysilane, $$CH_2=CR-CONH(CH_2)_3-Si(OCOCH_2CH_3)_3$$

2-(meth)acrylamide-2-methylpropyltriacetoxysilane, and $$CH_2=CR-CONH-\underset{\underset{CH_3}{|}}{\overset{\overset{CH_3}{|}}{C}}-CH_2-Si(OCOCH_3)_3$$

N-(2-(meth)acrylamide-ethyl)-aminopropyltriacetoxysilane;

$$CH_2=CR-CONH-CH_2CH_2NH(CH_2)_3Si(OCOCH_3)_3$$

(meth)acrylamide-alkyl di- or mono-alkoxy- or di- or mono-acyloxysilane (where R is hydrogen or a methyl group) such as
3-(meth)acrylamide-propylisobutyldimethoxysilane, $$CH_2=CR-CONH(CH_2)_3\underset{\underset{CH_3-CHCH_2CH_3}{|}}{Si(OCH_3)_2}$$

2-(meth)acrylamide-ethyldimethylmethoxysilane, $$CH_2=CR-CONH(CH_2)_2-\underset{\underset{CH_3}{|}}{\overset{\overset{CH_3}{|}}{Si}}-OCH_3$$

3-(meth)acrylamide-propyloctyldiacetoxysilane, $$CH_2=CR-CONH(CH_2)_3\underset{\underset{(CH_2)_7CH_3}{|}}{Si(OCOCH_3)_2}$$

1-(meth)acrylamide-methylphenyldiacetoxysilane, and $$CH_2=CR-CONH-CH_2-\underset{\underset{C_6H_5}{|}}{Si(OCOCH_3)_2}$$

3-(meth)acrylamide-propylbenzyldiethoxysilane; and $$CH_2=CR-CONH-(CH_2)_3-\underset{\underset{CH_2-C_6H_5}{|}}{Si-(OCH_2CH_3)_2}$$

(N-alkyl(meth)acrylamide)-alkyltrialkoxy- or triacyloxy-silanes (where R is hydrogen or a methyl group) such as
3-(N-methyl-(meth)acrylamide)-propyltrimethoxysilane, and $$CH_2=CR-CON-(CH_2)_3-Si(OCH_3)_3$$
$$\underset{CH_3}{|}$$

2-(N-ethyl-(meth)acrylamide)-ethyltriacetoxysilane.

$$CH_2=CR-CON-CH_2CH_2Si(OCOCH_3)_3$$
$$\underset{CH_2CH_3}{|}$$

The above-mentioned silicon-containing olefinic unsaturated monomers (I) and (II) should preferably have as few non-hydrolyzable groups ($R^1_m$) as possible and as many hydrolyzable groups ($R^2_{3-m}$) as possible, so that the resulting modified PVA has the maximum reactivity with paper. Thus, most preferably, m should be 0.

In the case where polymerization is accomplished in a solvent, preferable solvents are a lower alcohol such as methanol and ethanol.

Polymerization may be performed batchwise or continuously. In batchwise polymerization, the composition of copolymer change with conversion of polymerization according to the ratio of copolymerization reactivity ($r_1$, $r_2$). In order to obtain a copolymer of uniform composition, it is desirable to employ the semi-batch process in which either or both of the monomers are added in such a way that the ratio of concentrations (by weight) of the monomers is kept substantially constant during polymerization. The quantities to be added may be calculated according to the formula proposed by R. J. Hanna in Industrial and Engineering Chemistry, Vol. 49, No. 2, 208-209 (1957).

In the case of multicolumn continuous polymerization, the monomer should preferably be added to the second and subsequent columns so that the monomer composition in each column is constant for the same reasons mentioned above.

The polymerization initiator is 2,2'-azobisisobutyronitrile, benzoyl peroxide, lauroyl peroxide, acetyl peroxide, and other known radical polymerization initiators. The polymerization temperature is usually in the range from 50° C. to the boiling point of the system.

That the ratio of concentrations of monomers is substantially constant means that the actual ratio of concentrations is in the range of 80 to 120% (variation ±20%), preferably 90 to 110% (variation ±10%), most preferably 95 to 105% (variation ±5%), of the set ratio of concentrations during polymerization.

The above-mentioned polymerization may be carried out in the presence of a small quantity of copolymerizable unsaturated monomers. Examples of such monomers include olefins such as styrene, alkylvinyl ether, vinyl ester of Versatic acid, (meth)acrylamide, ethylene, propylene, α-hexene, and α-octene; unsaturated acids such as (meth)acrylic acid, crotonic acid, maleic acid (anhydride), fumaric acid, and itaconic acid, and alkylesters and alkali salts thereof; sulfonic acid-containing monomer such as 2-methacrylamide-2-methylpropane-sulfonic acid and alkali salts thereof; and cationic monomers such as trimethyl-3-(1-(meth)acrylamide-1,1-dimethylpropyl)ammonium chloride, trimethyl-3-(1-(meth)acrylamidepropyl)ammonium chloride, 1-vinyl-2-methylimidazole, and quaternary compounds thereof.

The silicon-containing modified PVA used in this invention should preferably be produced by saponifying a copolymer of a vinyl ester and a silicon-containing olefinic unsaturated monomer. This process is easy to perform on an industrial scale and provides modified PVA of uniform quality.

When a copolymer of a vinyl ester and a silicon-containing olefinic unsaturated monomer as represented by the formula (I) is saponified, the saponified product is stable in viscosity and is also stable in an alkaline aqueous solution. On the other hand, when a copolymer of a vinyl ester and a monomer as represented by the formula (II) is saponified, the saponified product is inferior in stability in alkali, but superior in that the aqueous solution foams very little and provides a coating film, after drying, which is resistant to organic solvents and other agents. Thus, which monomer to select is dependent on the object and conditions of use.

The copolymer may be properly adjusted for the degree of polymerization by selecting the type and quantity of alcohol used as the solvent. After copolymerization, residual vinyl ester in the reaction solution should be distilled away. The silicon-containing olefinic unsaturated monomer remaining unreacted may be removed, or may be left unremoved without any trouble if the quantity is small.

The compolymer thus prepared is subsequently saponified. The saponified reaction is usually performed in an alcohol solution of the copolymer so that the reaction proceeds through alcoholysis. For this purpose, it is possible to use absolute alcohol or alcohol containing a small quantity of water. The alcohol may contain organic solvents such as methyl acetate and ethyl acetate as desired. The catalyst for saponification is an alkali metal hydroxide such as sodium hydroxide and potassium hydroxide; an alcoholate such as sodium methylate and potassium methylate; and an alkali such as ammonia. An acid catalyst such as hydrochloric acid and sulfuric acid may also be used. An alkali catalyst is advantageous from the standpoint of saponification rate, and sodium hydroxide is advantageous economically and industrially.

The saponification temperature is usually in the range from 10° to 50° C. As the result of saponification reaction, the vinyl ester units are saponified partly or to a great extent, and converted into the vinyl alcohol units. The ratio of conversion or the degree of saponification may be any value according to the intended object of use. During the saponification reaction, alkoxyl group, or acyloxyl group connected to the silicon in the silicon-containing olefinic unsaturated monomer units is also saponified partly or to a great extent into a silanol group or an alkali salt of silanol. These groups may partly form siloxane bonds when the modified PVA after saponification is dried. This is within the scope of this invention.

There are no specific limitations with respect to the content of silicon in the silicon-containing modified PVA, the degree of saponification, and the degree of polymerization. They are properly selected according to the intended object of use. The content of silicon is usually from 0.01 to 10 mol%, preferably 0.1 to 3 mol%. The degree of saponification is usually 70 to 100 mol%, preferably 80 to 100 mol%. The degree of polymerization is usually 100 to 3000, preferably 300 to 3000.

The silicon-containing modified PVA may be dissolved in water uniformly with stirring and heating. Where the silicon content is high and the siloxane bond exists in a large quantity, a uniform aqueous solution of the modified PVA may be obtained by dispersing it in water and then adding a small quantity of alkali metal hydroxide such as sodium hydroxide and potassium hydroxide, alkaline earth metal hydroxide such as magnesium hydroxide and calcium hydroxide; or an alkali such as ammonia water and amine, and heating with stirring. If necessary, the solution may be adjusted to a proper pH with an acid.

The coating agent of this invention is prepared by dissolving the modified PVA in water and is used in the form of aqueous solution as mentioned above. The concentration of the modified PVA is usually 0.2 to 30 wt%, preferably 2 to 10 wt%. An alkaline aqueous solution is preferable from the standpoint of stability of solution viscosity.

The coating agent of this invention may be incorporated, as required, with a tin compound or zinc compound which catalyzes the hydrolysis of the alkoxyl group or acyloxyl group connected to the silicon in the modified PVA; water resistant agent such as glyoxal and urea resin; a plasticizer such as glycol and glycerin; a pH adjusting agent such as ammonia, sodium hydroxide, sodium carbonate, and phosphoric acid; and other known additives such as antifoam, release agent, and surface active agent.

In addition, the coating agent of this invention may be incorporated with other coating compounds such as PVA, modified PVA (e.g., carboxyl-modified PVA, sulfonic-modified PVA, acrylamide-modified PVA, cation modified PVA, long chain alkyl-modified PVA), starch, modified starch, casein, CMC, or synthetic resin emulsion (e.g., styrene-butadiene latex, polyacrylate ester emulsion, polyvinyl acetate emulsion, vinyl acetate-acrylate ester copolymer emulsion, and vinyl acetate-ethylene copolymer emulsion).

Further, the coating agent of this invention may be incorporated, as required, with pigments such as clay, calcium carbonate, titanium dioxide, satin white, zinc oxide, silica, aluminum oxide, and cadmium sulfide.

The coating agent of this invention is used for paper coating in order to improve the paper surface properties such as surface strength, printability, and barrier properties. It is particularly suitable for clear coating, but it may be incorporated with pigments such as clay, calcium carbonate, titanium dioxide, and satin white. For clear coating, the silicon-containing modified PVA is applied in an amount of 0.1 to 20 g/m$^2$, preferably 0.5 to 5 g/m$^2$. In the case of pigmented coating, the silicon-containing modified PVA is used in an amount of 3 to 10 parts for 100 parts of pigment. The solid content in the coating solution is 30 to 63%.

The coating agent of this invention may be applied to any kind of paper to achieve the above-mentioned objects. It may be applied preferably to paper board such as manila board, white board, and liners; and printing paper such as wood free paper, paper containing wood, gravure paper, and wet-strength paper, which papers are cellulosic ones made from pulp. It may also be applied to synthetic paper, synthetic fiber paper, and paper of a mixture of synthetic fibers and cellulose.

The above-mentioned coating solution may be applied to paper by means of the known size press coater, roll coater, air knife coater, or blade coater. The quantity of coating is not specifically restricted, but is usually 1 to 30 g/m² as solids.

When applied to paper, the paper coating agent of this invention greatly improves the surface properties of paper such as surface strength, printability, and barrier properties as mentioned above. No complete elucidation has been made yet as to the mechanism for such performance, but the following presumption is made. The silicon atom to which alkoxyl groups or acyloxyl groups connect in the silicon-containing modified PVA or the silanol group or salt thereof which is their hydrolyzate, is reactive with cellulose fibers of paper and pigments and aluminum compounds in paper, and also with the hydroxyl group or silanol group in the modified PVA. Therefore, the reaction takes place on the surface layer of paper as the solution of the silicon-containing modified PVA comes in contact with paper, and the solution becomes viscous and gelled immediately. Thus the agent does not penetrate into paper but forms a firm uniform film on the surface layer of paper.

The coating agent of this invention may also be used to prepare offset printing plates by coating it on wet-strength paper. The wet-strength paper means paper prepared by adding or applying melamine resin, urea resin, polyamide resin, or polyethyleneimine resin.

The offset printing plate is composed of a substrate of wet-strength paper and an image receiving layer or photoconductive layer formed on the substrate, with or without a water resistant intermediate layer between the substrate and the image receiving layer or photoconductive layer. The substrate is backed by a back coat layer. The coating agent of this invention may be used to form at least one of the above-mentioned layers. It is particularly useful to form either or both of the image receiving layer and the water resistant intermediate layer. For the image receiving layer and water resistant layer, the above-mentioned modified PVA or vinyl resin emulsion containing the modified PVA is used as the coating agent. The coating agent is usually incorporated with pigment such as clay, calcium carbonate, zinc oxide, silica, aluminum oxide, barium sulfate, and titanium oxide, pigment dispersant, antifoam, and water-soluble resin such as PVA.

The image receiving layer or water resistant intermediate layer may be formed by applying the coating compound onto the substrate and drying it. The quantity of application is 1 to 30 g/m² as dry solids. The application should be made so that the quantity of the silicon-containing modified PVA is 0.1 to 20 g/m², preferably 1 to 15 g/m².

To form the photoconductive layer, the modified PVA or the vinyl resin emulsion containing the modified PVA is incorporated with pigment such as zinc oxide, cadmium sulfide, and titanium oxide having photoconductivity. The photoconductive layer is formed by applying the above-mentioned coating agent onto the above-mentioned water resistant intermediate layer.

The offset printing plate is sometimes provided on its back side with a back coat layer containing a curl preventing agent, conductive agent, or humectant. And the coating agent of this invention may be used to form such a back coat layer.

The image receiving layer, water resistant intermediate layer, or back coat layer formed by the coating agent of this invention is hydrophilic and superior in water resistance. This remarkable performance is attributable to the hydroxyl groups derived from PVA and water-insoluble film derived from silicon. In other words, the alkoxyl groups or acyloxyl groups connected to silicon in the modified PVA, or the silanol groups of salt thereof which are their hydrolyzate, self-condensate, crosslink, and react with the pigment of substrate to form a water-insoluble film when the PVA solution is dried.

Planographic printing (or offset printing) is described below. In the case of direct writing type offset printing, letters are written on the image receiving layer by a typewriter or by hand with oil ink. The image is also formed by transferring a xerograph image onto the image receiving layer, followed by thermal fixing.

In the case of planographic printing plates based on electrophotography, the photoconductive layer is exposed to uniform corona discharge and then an image is formed by dry or wet development.

The plate with an image formed thereon is then treated with an etching solution so that the non-image area is desensitized and is made hydrophilic. The image area remains lipophilic because it is covered with a lipophilic ink or toner which keeps out the etching solution. In the desensitizing process, the plate is treated with an aqueous solution containing sodium ferrocyanide, ammonium phosphate, citric acid, or phytic acid.

The desensitized area dampened with damping water repels oil ink, and the lipophilic image area attracts oil ink. The oil ink on the image area is transferred to paper. Thus, the offset printing plate desensitized as above can perform printing.

The coating agent of this invention may be used to produce converting paper. Converting paper is a stock from which are produced release paper by applying a release agent such as silicone resin, paper having low abrasion resistance by applying a slip agent such as silicone resin, masking paper, and transfer paper.

In the production of converting paper, the coating agent of this invention may be applied efficiently in the same way as used for the conventional water-soluble resin. The resulting converting paper prevents an organic solvent or coating material from penetrating into paper and increases the retention of a coating material on the surface of paper. No complete elucidation has been made yet as to the mechanism for such performance, but the following presumption is made. The silicon atom to which alkoxyl groups or acyloxyl groups connect in the silicon-containing modified PVA or the silanol group or salt thereof which is their hydrolyzate, is reactive with cellulose fibers of paper and pigments and aluminum compounds in paper, and also with the hydroxyl group or silanol group in the modified PVA. Therefore, the reaction takes place on the surface layer of paper. Thus the compound does not penetrate into paper but forms a firm uniform film on the surface layer of paper. In the particular case where the coating material is silicone, the silicon atoms in the modified PVA connect firmly to the silicone. Thus the silicone film stay firmly on the surface of paper and does not migrate to the adhesive layer in the case of tackified paper. The silicone is usually a silicone resin.

The coating composition of this invention may also be used to produce thermosensitive paper. Thermosensitive paper is composed of a paper substrate and a thermosensitive coating layer formed thereon. The coating layer is formed by applying a thermosensitive coating liquid composed of a color-developing lactone compound, an acid compound such as phenol compound, and a watersoluble binder. The color developing lactone compound and the phenol compound are pulverized into fine powder separately. The coating liquid is incorporated with a filler such as clay, wax, and surface active agent, as required. If the coating agent of this invention is used as the above-mentioned water-soluble binder, the resulting thermosensitive layer is superior in barrier properties for water and organic solvents. Therefore, the image formed on the thermosensitive layer is well conserved even when the thermosensitive paper comes in contact with water or organic solvents.

In the production of thermosensitive paper, the coating agent of this invention may be applied to the substrate prior to the application of the thermosensitive coating liquid, so that the layer of the silicon-containing modified PVA is formed on the substrate. In the other way, it is also possible to apply the thermosensitive coating liquid (which does not contain the coating agent of this invention) to the substrate to form the thermosensitive layer, and then to apply the coating agent of this invention on the thermosensitive layer to form the layer of the silicon-containing modified PVA.

In case where the coating agent of this invention is used as the water-soluble binder of the thermosensitive coating liquid, the silicon-containing modified PVA should be used in an amount of 1 to 500 parts by weight, preferably 2 to 200 parts by weight, for 100 parts by weight of the color developing component.

The thermosensitive paper produced by applying the coating agent of this invention is characterized by that the image is well conserved even when the paper comes in contact with water or organic solvents. No complete elucidation has been made yet as to the mechanism for such performance, but the following presumption is made. The silicon atom to which alkoxyl groups or acyloxyl groups connect in the silicon-containing modified PVA or the silanol group or salt thereof which is their hydrolyzate, readily self-condensate, crosslink; and react with the filler and substrate, to form a water-insoluble film which is superior in barrier properties for organic solvents. This film firmly fastens the developed image and protects it from water and organic solvents.

The invention is now described in detail with reference to the following examples, in which "parts" and "%" are "parts by weight" and "wt%" unless otherwise specified.

EXAMPLE 1

In a reactor equipped with a stirrer, thermometer, and reflux condenser were placed 2800 parts of vinyl acetate, 500 parts of methanol, and 16.8 parts of vinyltrimethoxysilane. The atmosphere in the reaction system was replaced with nitrogen while stirring. The temperature was raised to 60° C. To this system was added 200 parts of methanol solution containing 1.96 parts of 2,2'-azobisisobutyronitrile. Polymerization was continued for 3.5 hours. When polymerization was terminated, the solid content in the system was 40%. Vinyl acetate remaining unreacted was expelled by introducing methanol vapor. Thus, 35% methanol solution of copolymer was obtained. For saponification reaction, a methanol solution containing sodium hydroxide in an amount of 3 mol% for the vinyl acetate unit was added with stirring to the methanol solution of copolymer at 40° C. The resulting white gel was crushed and washed with methanol completely to remove unreacted vinyltrimethoxysilane. After drying, silicon-containing modified PVA was obtained. The degree of polymerization was 1700. According to NMR spectroscopy, IR spectroscopy, and atomic-absorption spectroscopy, the copolymer was found to contain 0.5 mol% of vinyltrimethoxysilane unit and the degree of saponification of vinyl acetate unit was found to be 99.9 mol%.

A coating solution containing 4.5% of PVA was prepared by heating 4.5 parts of the modified PVA, 95.5 parts of water, and 0.045 parts of sodium hydroxide. This coating solution was applied to wood-free paper (basis weight 64 g/m$^2$) at 50° C. using a laboratory size press (made by Kumagai Riki Kogyo K.K.) at a nip pressure of 18 kg/cm and at a rate of 60 m/min. The quantity of sizepress coating was 1.0 g/m$^2$ (both sides) in terms of solids of modified PVA.

In Comparative Example 1, coated paper was prepared as in Example 1 using PVA having the degree of polymerization of 1700 and the degree of saponification of 98.5% (except that sodium hydroxide was not used).

In Comparative Example 2, coated paper was prepared as in Example 1 using modified PVA containing 2.1 mol% of lactone ring in the molecule and having the degree of saponification of 98.5% for vinyl acetate units (except that sodium hydroxide was not used).

In Comparative Example 3, coated paper was prepared as in Example 1 using modified PVA obtained by saponification of a copolymer of itaconic acid and vinyl acetate, said modified PVA containing 1.0 mol% of carboxyl group and having the degree of saponification of 88.0% for vinyl acetate units (except that sodium hydroxide was not used).

The resulting coated paper was measured for properties after conditioning in a constant-temperature room for 72 hours at 20° C. and 60% RH. The results are shown in Table 1.

TABLE 1

|  | *1 Viscosity of coating solution (cp) | Coating quantity (g/m$^2$) | *2 Surface strength (cm/sec) | *3 Air permeability (sec) | *4 Printability |
|---|---|---|---|---|---|
| Example 1 | 17 | 1.0 | 220 | 1500 | Good |
| Comparative Example 1 | 17 | 1.0 | 148 | 25 | Fair |
| Comparative Example 2 | 17 | 1.0 | 160 | 30 | Fair |
| Comparative Example 3 | 17 | 1.0 | 155 | 700 | Fair |

Table 1 indicates that the coating agent of this invention imparts improved surface strength, air permeability, and printability to the coated paper.
Note:
*1 Measured with a Brookfield viscometer at 60 rpm and 50° C.
*2 Measured with a IGT printability testing machine and IGT pick oil M ink (made by Dainippon Ink & Chemicals, Inc.) at a printing pressure of 35 kg/cm, spring drive B. The greater the values, the higher the surface strength.
*3 Measured with an Oken-type air permeability tester. The greater the values, the higher the barrier properties.
*4 Snap dry ink (made by Dainippoin Ink & Chemicals, Inc.) was applied in a thickness of 5μ using an RI printability testing machine. The results were ranked in three grades of good, fair, and poor according to the overall evaluation as to ink receptivity and printing gloss and others.

Example 2

In the same reactor as in Example 1 were placed 2800 parts of vinyl acetate, 44 parts of vinyltriacetoxysilane, and 3.92 parts of 2,2'-azobisisobutyronitrile. The atmosphere in the reaction system was replaced with nitrogen while stirring. The temperature was raised to 60° C. Polymerization was continued for 3.5 hours. When polymerization was terminated, the solid content in the system was 49%. Unreacted vinyl acetate was expelled by introducing methanol vapor. Thus, 35% methanol solution of copolymer was obtained. For saponification reaction, a methanol solution containing sodium hydroxide in an amount of 5 mol% for the vinyl acetate unit was added with stirring to the methanol solution of copolymer at 40° C. The resulting white gel was crushed and washed with methanol completely to remove unreacted vinyltriacetoxysilane. After drying, silicon-containing modified PVA was obtained. The degree of polymerization was 1500. According to atomic-absorption spectroscopy and chemical analysis, the copolymer was found to contain 1.1 mol% of vinylsilane unit and the degree of sapanification of vinyl acetate units was found to be 99.9 mol%.

A coating solution containing 4.5% of PVA was prepared by heating 4.5 parts of the modified PVA, 95.5 parts of water, and 0.225 part of sodium hydroxide. Using this coating solution, coated paper was prepared as in Example 1. The properties of the resulting coated paper are shown in Table 2.

EXAMPLE 3

In a reactor equipped with a stirrer, thermometer, dropping funnel, and reflux condenser were placed 2800 parts of vinyl acetate, 11 parts of triacetoxysilane, and 3.92 parts of 2,2'-azobisisobutyronitrile. The atmosphere in the reaction system was replaced with nitrogen while stirring. The temperature was raised to 60° C. Polymerization was continued for 3 hours while adding dropwise 33 parts of vinyltriacetoxysilane so that the concentration ratio of vinylacetoxysilane to vinyl acetate is kept constant in the system. When polymerization was terminated, the solid content in the system was 49%. Unreacted vinyl acetate was expelled by introducing methanol vapor. Thus, 35% methanol solution of copolymer was obtained. This copolymer was saponified as in Example 2. Thus, silicon-containing modified PVA was obtained which has the degree of polymerization of 1550 and the degree of saponification of 99.9 mol% for vinyl acetate unit and contains 1.0 mol% of vinylsilane unit. Using a coating solution of this modified PVA, coated paper was prepared as in Example 2.

The properties of the resulting coated paper are shown in Table 2.

TABLE 2

| | Viscosity of coating solution (cp) | Coating quantity (g/m$^2$) | Surface strength (cm/sec) | Air permeability (sec) | Printability |
|---|---|---|---|---|---|
| Example 2 | 17 | 1.0 | 230 | 3500 | Good |
| Example 3 | 15 | 1.0 | 265 | 6500 | Good |

It is to be noted from Table 2 that the product in Example 3 in which vinyltriacetoxysilane was added continuously so that the concentration ratio of monomer is kept constant in the polymerization system is superior in performance to the product in Example 2 in which vinyltriacetoxysilane was added all at once at the beginning of polymerization.

EXAMPLES 4 TO 11

Sizepress coating was carried out as in Example 1 except that the modified PVA was replaced by various kinds of silicon-containing modified PVA. The results are shown in Table 3.

Polymerization was carried out by adding continuously silicon-containing olefinic unsaturated monomer so that the concentration ratio of monomers (vinyl acetate to silicon-containing olefinic unsaturated monomer) is kept constant in the polymerization system.

TABLE 3

| | | Modified PVA | | | Coating solution | | Properties of coated paper | | | |
|---|---|---|---|---|---|---|---|---|---|---|
| Example | Silicon-containing olefinic unsaturated monomer | Silicon-containing monomer unit (mol %) | Degree of saponification of vinyl acetate unit (mol %) | Degree of polymerization | NaOH %/ (modified PVA) | Viscosity (cp) | Coating quantity (g/m$^2$) | Surface strength (cm/sec) | Air permeability (sec) | Printability |
| 4 | Vinyltriacetoxysilane | 3.0 | 99.9 | 1600 | 2 | 15 | 1.0 | 300 | 10000 | Good |
| 5 | Vinyltriethoxysilane | 1.0 | 99.9 | 1650 | 1 | 17 | 1.0 | 250 | 5000 | Good |
| 6 | Vinylisobutyldimethoxysilane | 0.5 | 99.8 | 1700 | 0.5 | 17 | 1.0 | 220 | 2500 | Good |
| 7 | 3-Acrylamide-propyl-trimethoxysilane | 0.2 | 87.8 | 1750 | 0 | 16 | 1.0 | 190 | 5000 | Good |
| 8 | 3-Acrylamide-propyl-triethoxysilane | 0.3 | 99.8 | 1700 | 0 | 18 | 1.0 | 200 | 800 | Good |
| 9 | 2-Acrylamide-2-methyl-propyltrimethoxysilane | 1.0 | 99.5 | 1650 | 0.5 | 17 | 1.0 | 250 | 5000 | Good |
| 10 | 2-Acrylamide-isopropyltrimethoxysilane | 0.5 | 99.9 | 1700 | 0 | 17 | 1.0 | 210 | 1500 | Good |
| 11 | N—(2-acrylamide-ethyl)-aminopropyltrimethoxysilane | 0.2 | 87.6 | 1700 | 0 | 16 | 1.0 | 200 | 5000 | Good |

EXAMPLE 12

Three parts of modified PVA prepared in Example 1 and 0.03 part of sodium hydroxide were dissolved in 97 parts of water, whereby a coating solution containing 3.0% of PVA was prepared. Using a Dixon coater, this coating solution was applied (0.4 g/m$^2$) to white paper board (basis weight of 300 g/m$^2$) at a rate of 10 m/min. The coated paper was finished by calender rolls (two-stage roll of chilled steel/chilled steel) at a surface temperature of 60° C., a linear pressure of 100 kg/cm, and a rate of 10 m/min.

In Comparative Examples 4 and 5, coated paper was prepared as in Example 12 using the PVA as used in Comparative Examples 1 and 2, respectively (except that sodium hydroxide was not used).

The resulting coated paper was measured for the physical properties after conditioning for 72 hours in a constant temperature room at 20° C. and 60% RH. The results are shown in Table 4.

It is to be noted from Table 4 that the coated paper prepared from the coating agent of this invention is outstanding in surface strength, abrasion strength, Cobb water absorption, and printability.

The viscosity of the coating solutions in Example 12 and Comparative Examples 4 and 5 was 10.5 cp, 11.0 cp, and 10.2 cp, respectively. (measured by a Brookfield viscometer, at 30° C., 60 rpm)

TABLE 4

|  | *5 Surface strength (cm/sec) | *6 Abrasion strength (mg) | *7 Cobb water absorption (g/m²) | *8 Printability |
|---|---|---|---|---|
| Example 12 | 170 | 4.3 | 15.1 | Good |
| Comparative Example 4 | 100 | 20.5 | 28.9 | Fair |
| Comparative Example 5 | 110 | 13.2 | 28.0 | Fair |

Note:
*5Measured in the same manner as described in Note *2 in Example 1.
*6Measured in accordance with TAPPI standard method T476. The lower the value, the higher the abrasion strength.
*7Measured in accordance with JIS P8140. Paper is kept in contact with water for 60 seconds. The smaller the value, the higher the water resistance.
*8Measured in the same manner as described in Note *4 in Example 1.

EXAMPLES 13 TO 18

Example 12 was repeated except that the modified PVA used in Example 12 was replaced by the silicon-containing PVA as shown in Table 5. The results are shown in Table 5.

adding 27 parts of methanol solution containing 6.7 parts of 3-acrylamide-propyltrimethoxysilane in such a manner that the concentration ratio (3-acrylamide-propyltrimethoxysilane to vinyl acetate) was kept constant in the polymerization system. When polymerization was terminated, the solid content in the system was 21%. Unreacted vinyl acetate monomer was expelled by introducing methanol vapor. Thus, 35% methanol solution of copolymer was obtained. For saponification reaction, a methanol solution containing sodium hydroxide in an amount of 2.0 mol% for the vinyl acetate unit was added with stirring to the methanol solution of copolymer at 40° C. The resulting white gel was crushed and washed with methanol completely to remove unreacted 3-acrylamide-propyltrimethoxysilane monomer. After drying, modified PVA was obtained. The degree of polymerization was 550. The copolymer was found to contain 0.3 mol% of 3-acrylamide-propyltrimethoxysilane unit, 99.4 mol% of vinyl alcohol unit, and 0.3 mol% of vinyl acetate unit.

A coating agent was prepared as follows: 100 parts of kaolin clay was dispersed uniformly with agitation into 47.5 parts of aqueous solution containing 0.5 part of sodium hexametaphosphate. The resulting dispersion was added to 30 parts of 20% aqueous solution of the above-mentioned silicon-containing modified polyvinyl alcohol. Thus, a coating agent containing 60% solids and having a viscosity of 3100 cp at 30° C. was obtained.

This coating agent was applied to wood-free paper (basis weight 64 g/m²) using a laboratory flexible blade coater in such a manner that the coating quantity was 15 g/m² for solids (0.85 g/m² for silicon-containing modified PVA). After drying at 105° C. for 2 minutes, the

TABLE 5

| | Modified PVA | | | | Coating solution | | | Properties of coated paper | | | |
|---|---|---|---|---|---|---|---|---|---|---|---|
| Example | Silicon-containing olefinic unsaturated monomer | Degree of saponification of vinyl acetate unit (mol %) | Degree of polymerization | NaOH (%/PVA) | Viscosity (cp) | Coating quantity (g/m²) | Surface strength (cm/sec) | Abrasion strength (mg) | Cobb water absorption (g/m²) | Printability |
| 13 | Vinyltriacetoxysilane | 3.0 | 99.9 | 1600 | 2 | 9.0 | 0.4 | 220 | 2.1 | 12.4 | Good |
| 14 | Vinyltriethoxysilane | 0.5 | 99.8 | 1700 | 0.5 | 11.0 | 0.4 | 170 | 4.6 | 15.5 | Good |
| 15 | Vinylisobutyldimethoxysilane | 0.2 | 99.7 | 1750 | 0 | 11.0 | 0.4 | 150 | 7.8 | 19.6 | Good |
| 16 | 3-Acrylamide-propyltrimethoxysilane | 0.3 | 99.8 | 1700 | 0 | 10.5 | 0.4 | 150 | 6.5 | 19.2 | Good |
| 17 | 2-Acrylamide-2-methylpropyltrimethoxysilane | 1.0 | 99.5 | 1650 | 0.5 | 10.0 | 0.4 | 190 | 3.3 | 15.0 | Good |
| 18 | 2-Acrylamide-isopropyltrimethoxysilane | 0.5 | 99.9 | 1700 | 0 | 10.5 | 0.4 | 170 | 4.2 | 16.5 | Good |

EXAMPLE 19

In a reactor equipped with a stirrer, thermometer, dropping funnel, and reflux condenser were placed 1050 parts of vinyl acetate, 2000 parts of methanol, and 0.63 part of 3-acrylamide-propyltrimethoxysilane. The atmosphere in the reaction system was replaced with nitrogen while stirring. The temperature was raised to 60° C. To this system was added 450 parts of methanol solution containing 21 parts of 2,2'-azobisisobutyronitrile. Polymerization was continued for 3 hours while coated paper was finished by calendering at a surface temperature of 80° C. and under a linear pressure of 100 kg/cm. The coated paper was evaluated for properties after conditioning for 72 hours in a constant temperature room at 20° C. and 65% RH. The results are shown in Table 6.

In Comparative Example 6, coated paper was prepared as in Example 19, except that the modified PVA was replaced by PVA having the degree of saponification of 98.5% and the degree of polymerization of 550. The results are also shown in Table 6.

TABLE 6

|  | *9 Viscosity of coating solution (cp) | Coating quantity (solids) (g/m²) | *10 Surface strength (cm/sec) | *11 Whiteness (%) | *12 Gloss (%) | *13 Printability |
|---|---|---|---|---|---|---|
| Example 19 | 3100 | 15.0 | 200 | 82 | 56 | Good |

TABLE 6-continued

|  | Viscosity of coating solution (cp) [*9] | Coating quantity (solids) (g/m²) | Surface strength (cm/sec) [*10] | Whiteness (%) [*11] | Gloss (%) [*12] | Printability [*13] |
|---|---|---|---|---|---|---|
| Comparative Example 6 | 3200 | 15.1 | 135 | 80 | 47 | Fair |

Note:
[*9] Measured with a Brookfield viscometer at 60 rpm and 30° C.
[*10] Measured with an IGT printability tester using IGT pick oil M ink (made by Dainippon Ink & Chemicals, Inc.) at a printing pressure of 35 kg/cm with spring drive A. The greater the value, the higher the surface strength.
[*11] Measured with a Hunter reflectometer. The greater the value, the higher the whiteness.
[*12] Measured with a Hunter reflectometer. The greater the value, the higher the gloss.
[*13] Evaluated as described in Note [*4] in Example 1.

EXAMPLES 20 TO 23

Example 19 was repeated except that the modified PVA used in Example 19 was replaced by the silicon-containing PVA as shown in Table 7. The results are shown in Table 7.

TABLE 7

| Example | Silicon-containing olefinic unsaturated monomer | Modified PVA — (mol %) | Degree of saponification of vinyl acetate unit (mol %) | Degree of polymerization | Coating solution — NaOH (%/PVA) | Viscosity (cp) | Coating quantity (solids) (g/m²) | Properties of coated paper — Surface strength (cm/sec) | Whiteness (%) | Gloss (%) | Printability |
|---|---|---|---|---|---|---|---|---|---|---|---|
| 20 | Vinyltrimethoxysilane | 1 | 99.5 | 550 | 1 | 3100 | 15.1 | 220 | 83 | 57 | Good |
| 21 | Vinyltriacetoxysilane | 0.2 | 88.0 | 550 | 0 | 3050 | 15.0 | 160 | 81 | 53 | Good |
| 22 | 2-Acrylamide-2-methyl-propyltrimethoxysilane | 0.5 | 99.0 | 550 | 0.5 | 3100 | 15.2 | 190 | 82 | 55 | Good |
| 23 | 3-Acrylamide-propyl-triethoxysilane | 0.3 | 99.3 | 550 | 0 | 3100 | 15.1 | 170 | 82 | 54 | Good |

EXAMPLE 24

Copolymerization was carried out while adding vinylmethoxydioctyloxysilane continuously so that the concentration ratio of vinylmethoxydioctyloxysilane to vinyl acetate was kept constant throughout the period of polymerization. The resulting copolymer was saponified to obtain silicon-containing modified PVA which contains 0.6 mol% of vinylsilane unit and has the degree of polymerization of 1750 and the degree of saponification of 98.5% for vinyl acetate unit.

The following coating compound (aqueous dispersion) was prepared.

| 10% aqueous solution of the modifed PVA | 90 parts |
|---|---|
| Dibutyltindilaurate (Catalyst to hydrolyze the alkoxyl group connecting to silicon atom) | 0.18 parts |
| 50% aqueous dispersion containing 30% zinc oxide and 70% clay | 80 parts |
| Water | 60 parts |

The aqueous dispersion of the above composition was applied to the surface of a substrate (wet-strength paper, 90 g/m²), followed by drying at 130° C. for 1 minute, to form an image receiving layer (about 20 g/m²).

The reverse side of the substrate was coated with a dispersion of the following composition, followed by drying at 130° C. for 5 minutes, to form a backcoat layer (about 10 g/m²). The coated paper was subjected to supercalendering. Thus, a direct-writing type offset printing plate was prepared.

| 50% emulsion of styrene-butadiene copolymer (DL636, Dow Chemical) | 10 parts |
|---|---|
| 10% aqueous solution of PVA (made by Kuraray Co., Ltd.) | 45 parts |
| 50% aqueous dispersion of clay | 80 parts |
| 80% aqueous dispersion of melamine-formalin resin | 2.5 parts |
| Ammonium chloride | 0.1 parts |
| Water | 70 parts |

After typing and desensitizing with an etching solution, this plate was used for offset printing. More than 2000 sheets could be printed without scumming.

COMPARATIVE EXAMPLE 7

A direct writing type offset printing plate was prepared and printing test with it was carried out as in Example 24, except that dibutyltin dilaurate was not used and the silicon-containing modified PVA was replaced by PVA (PVA 117, a product of Kuraray Co., Ltd.) having the degree of saponification of 98.5% and a viscosity of 30 cp for 4% aqueous solution at 20° C.

Scumming occurred in the tenth sheet.

EXAMPLE 25

Copolymerization was carried out while adding vinylmethyldimethoxysilane continuously so that the concentration ratio of vinylmethyldimethoxysilane to vinyl acetate was kept constant throughout the period of polymerization. The resulting copolymer was saponified to obtain silicon-containing modified PVA which contains 0.25 mol% of vinylsilane unit and has the degree of polymerization of 650 and the degree of saponification of 87% for vinyl acetate unit.

In a reactor equipped with a stirrer, thermometer, dropping funnel, and reflux condenser were placed 450 parts of 10 aqueous solution of the above-mentioned modified PVA, 10 parts of ethyl acrylate, and 50 parts of vinyl acetate. After uniform emulsification, 41 parts of 6% ammonium persulfate and 60 parts of 10% sodium bisulfite were added. The temperature was raised to 60° C., and emulsion polymerization was carried out for 3 hours. During polymerization, a mixture of 90 parts of ethyl acrylate and 450 parts of vinyl acetate and 80 parts of 2% aqueous solution of ammonium persulfate were added dropwise. Then, the temperature of the system was raised to 70° C. for ageing for 30 minutes. After cooling to room temperature, the reaction product was adjusted to pH 5.0 with 10% aqueous solution of ammonia.

The following coating agent was prepared.

| | |
|---|---|
| Emulsion prepared as above | 60 parts |
| Clay | 60 parts |
| 10% aqueous solution of silicon-containing modified PVA which contains 0.5 mol % of vinylsilane unit and has the degree of polymerization of 650 and the degree of saponification of 98.5 mol % for vinyl acetate. (prepared as in Example 25 by saponifying a copolymer of vinyltriacetoxysilane and vinyl acetate) | 70 parts |

The coating agent prepared as above was applied to a paper substrate (120 g/m², surface-sized with PVA) in an amount of 3 g/m² as solids, to form an intermediate layer. The coating was dried at 140° C. for 30 seconds.

The intermediate layer was further coated with a coating agent of the following composition, followed by drying at 150° C. for 1 minute, to form an image receiving layer (7 g/m²).

| | |
|---|---|
| Calcium carbonate | 35 parts |
| Clay | 15 parts |
| Water | 30 parts |
| 10% aqueous solution of silicon-containing modified PVA which contains 0.4 mol% of vinylsilane unit and has the degree of polymerization of 1700 and the degree of saponification of 95.5 mol % for vinyl acetate. (prepared as in Example 25 by saponifying a copolymer of vinyltriacetoxysilane and vinyl acetate) | 45 parts |

After typing and desensitizing with an etching solution, this plate was used for offset printing. More than 1000 sheets could be printed without scumming.

COMPARATIVE EXAMPLE 8

An offset printing plate was prepared and printing test with it was carried out as in Example 25, except that the intermediate layer and image receiving layer were formed by applying the following compounds. Scumming occurred in the 600th sheet.

Compound for the intermediate layer:

| | |
|---|---|
| Emulsion prepared in Example 25, except that the modified PVA was replaced by partially saponified PVA (PVA-217, made by Kuraray Co., Ltd.), degree of polymerization: 1700, degree of saponification: 88 mol % | 60 parts |
| Amino resin (SR-613, made by Sumitomo Chemical Co., Ltd.) | 3 parts |
| Clay | 60 parts |
| 10% aqueous solution of PVA (PVA-105, made by Kuraray Co., Ltd.), degree of polymerization: 500, degree of saponification: 99.8 mol % | 70 parts |

Compound for the image receiving layer:

| | |
|---|---|
| Calcium carbonate | 35 parts |
| Clay | 15 parts |
| PVA (PVA-117, made by Kuraray Co., Ltd.), degree of polymerization: 1700, degree of saponification: 98.5 | 45 parts |
| Water | 30 parts |

EXAMPLE 26

A conductive coating agent of the following composition was applied to the reverse side of a paper substrate (wet-strength paper: 100 g/m²) in a coating quantity of 4 g/m².

| | |
|---|---|
| PVA (PVA-117, made by Kuraray Co., Ltd.), degree of polymerization: 1700, degree of saponification: 98.5 | 30 parts |
| Vinyl acetate resin (Cevian A-522, made by Daisel Ltd.) | 50 parts |
| Quaternary ammonium conductive agent (ECR-34, made by Dow Chemical) | 20 parts |

A coating agent of the following composition was applied to the surface of the substrate, followed by drying at 130° C. for 3 minutes, to form an intermediate layer of about 10 g/m².

| | |
|---|---|
| Acrylic ester emulsion, 46% solids (Primal HA16, made by Nippon Acryl Kagaku K.K.) | 40 parts |
| Clay | 40 parts |
| 10% aqueous solution of silicon-containing modified PVA which contains 0.5 mol% of vinylsilane unit and has the degree of polymerization of 650 and the degree of saponification of 98.5 mol% for vinyl acetate. (prepared as in Example 25 by saponifying a copolymer of vinyltriacetoxysilane and vinyl acetate) | 60 parts |

A coating agent of the following composition was applied onto the above-mentioned intermediate layer to form a photoconductive layer with a coating quantity of 25 g/m² as solids.

| | | |
|---|---|---|
| Photoconductive zinc oxide (Sazex-2000, made by Sakai Kagaku K.K.) | 100 | parts |
| Silicone resin (KR-211, made by Shin-etsu Chemical Co., Ltd.) | 30 | parts |
| Rose bengal | 0.1 | part |
| Toluene | 150 | parts |

The coated product was conditioned for 24 hours in a dark place at 25° C. and 50% RH, and then passed through an electronic platemaking machine, Aitech Model 175, followed by desensitizing with an etching solution (made by Aitech Co., Ltd.). The resulting plate was used for offset printing. After printing of 5000 sheets, the plate was still in good condition, without any sign of wrinkle and peeling.

COMPARATIVE EXAMPLE 9

An offset printing plate was prepared and printing test with it was carried out as in Example 26, except that the silicon-containing modified PVA for the intermediate layer was replaced by 15 parts of acrylic ester emulsion (46% solids) and 46 parts of water. Scumming occurred in the 700th sheet.

EXAMPLES 27 TO 32

An offset printing plate was prepared and printing test with it was carried out as in Example 24, except that the silicon-containing modified PVA for the image-receiving layer was replaced by the following different kinds of silicon-containing modified PVA. In all the cases, good printing exceeding 1000 sheets was accomplished without scumming.

Silicon-containing modified PVA used in Example 27.

Silicon-containing modified PVA which is prepared by saponifying copolymer of vinyl acetate and vinyltrimethoxysilane and contains 0.5 mol% of vinylsilane unit and has the degree of polymerization of 1650 and the degree of saponification of 99.1 mol% for vinyl acetate unit, prepared as in Example 25.

Silicon-containing modified PVA used in Example 28.

Silicon-containing modified PVA which is prepared by saponifying copolymer of vinyl acetate and 3-acrylamide-propyltriethoxysilane and contains 0.4 mol% of 3-acrylamide-propylsilane unit and has the degree of polymerization of 1650 and the degree of saponification of 99.6 mol% for vinyl acetate unit. Silicon-containing modified PVA used in Example 29.

Silicon-containing modified PVA which is prepared by saponifying copolymer of vinyl acetate and vinyltris-($\beta$-methoxyethoxy)silane and contains 1 mol% of vinylsilane unit and has the degree of polymerization of 2000 and the degree of saponification of 99.5 mol% for vinyl acetate unit.

Silicon-containing modified PVA used in Example 30.

Silicon-containing modified PVA which is prepared by saponifying copolymer of vinyl acetate and vinyldimethylmethoxysilane and contains 2 mol% of vinylsilane unit and has the degree of polymerization of 1750 and the degree of saponification of 99.2 mol% for vinyl acetate unit.

Silicon-containing modified PVA used in Exaple 31. Silicon-containing modified PVA which is prepared by saponifying copolymer of vinyl acetate and 2-acrylamide-2-methyl propyltrimethoxysilane and contains 0.25 mol% of 2-acrylamide-2-methylpropylsilane unit and has the degree of polymerization of 1700 and the degree of saponification of 98.5 mol% for vinyl acetate unit.

Silicon-containing modified PVA used in Example 32.

Silicon-containing modified PVA which is prepared by saponifying copolymer of vinyl acetate and vinyltriethoxysilane and contains 0.5 mol% of vinylsilane unit and has the degree of polymerization of 1700 and the degree of saponification of 99.5 % for vinyl acetate unit.

EXAMPLE 33

Silicon-containing modified PVA was prepared by saponifying a copolymer of vinyltriacetoxysilane (0.4 mol%) and vinyl acetate (99.6%) as in Example 25, which contains 0.4 mol% of vinylsilane unit and has the degree of polymerization of 1650 and the degree of saponification of 99.4 mol% for vinyl acetate unit.

This modified PVA was dissolved in water containing sodium hydroxide in an amount of 2% based on the modified PVA. Thus, 10% aqueous solution of modified PVA was prepared.

A coating agent was prepared from 90 parts of the 10% aqueous solution of modified PVA, 80 parts of 50% aqueous dispersion composed of zinc oxide and clay (3:7), and 60 parts of water. This coating agent was applied to the surface of a paper substrate (wet-strength paper, 90 g/m$^2$), followed by drying at 130° C. for 1 minute, to form an image receiving layer of about 20 g/m$^2$.

To the reverse side of the substrate was applied a conductive coating compound of the following composition to form a back coat layer of 4 g/m$^2$ (as dry solid). Thus, a direct writing type offset printing plate was prepared.

| | |
|---|---|
| 10% aqueous solution of the above-mentioned modified PVA | 45 parts |
| Clay (50% aqueous dispersion) | 80 parts |
| Water | 70 parts |

The plate was processed with Ricoh P500 (ppc duplicating machine, made by Ricoh Co., Ltd.) and desensitized with an etching solution. The plate permitted clear printing of more than 2000 sheets without scumming.

In Comparative Example 10, an offset printing plate was prepared as in Example 33 except that the silicon-containing PVA was replaced by PVA (PVA-EC, made by Kuraray Co., Ltd.) having the degree of saponification of 99.9 mol% and a viscosity of 27 cp (4% aq. solution at 20° C.). In the printing test with this plate, scumming occurred in the 20th sheet.

What is claimed is:

1. A method of coating paper to improve the surface strength and printability of the paper, comprising applying an effective amount of a silicon-containing modified polyvinyl alcohol to said paper in the form of an alkaline aqueous solution, wherein the silicon-containing modified polyvinyl alcohol is a water soluble product obtained by an alcoholysis of a copolymer of a vinyl ester and an olefinic unsaturated monomer containing silicon in the molecule.

2. The method of claim 1, wherein the olefinic unsaturated monomer containing silicon in the molecule is represented by the formula (I):

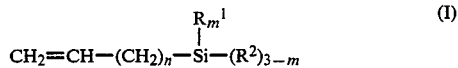

$$CH_2=CH-(CH_2)_n-Si-(R^2)_{3-m} \quad\overset{R^1_m}{|} \quad (I)$$

wherein
n is 0 to 4,
m is 0 to 2,
R$^1$ is a non-hydrolyzable group, and
R$^2$ is a hydrolyzable group.

3. The method of claim 2, wherein
R$^1$ is aryl or lower alkyl which may be substituted by aryl; and
R$^2$ is alkoxyl or acyloxyl which may have a substituent group containing oxygen or nitrogen.

4. The method of claim 2, wherein
R$^1$ is C$_6$–C$_{18}$ aryl or C$_1$–C$_5$ lower alkyl, which may be substituted by C$_6$–C$_{18}$ aryl; and $R^2$ is alkoxyl or acyloxyl of 1 to 40 carbon atoms which may have a substituent containing oxygen or nitrogen.

5. The method of claim 2, wherein
m and n are 0 and 0 to 4, respectively; and
$R^2$ is $C_1$-$C_{40}$ alkoxyl.

6. The method of claim 2, wherein
both m and n are 0; and
$R^2$ is $C_1$-$C_{18}$ alkoxyl.

7. The method of claim 2, wherein
m and n are 0 and 0 to 4, respectively, and
$R^2$ is $C_2$-$C_{18}$ acyloxyl.

8. The method of claim 1, wherein the olefinic unsaturated monomer has the formula (II):

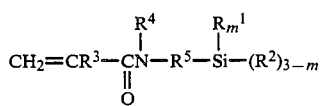

(II)

wherein
m is 0 to 2;
$R^1$ is a non-hydroylzable group;
$R^2$ is a hydrolyzable group;
$R^3$ is hydrogen or methyl;
$R^4$ is hydrogen or $C_1$-$C_5$ alkyl; and
$R^5$ is $C_1$-$C_5$ alkylene or an organic divalent residue wherein the carbon chain is interrupted by an oxygen atom or nitrogen atom.

9. The method of claim 8, wherein
$R^1$ is an aryl group or lower alkyl which may be substituted by aryl; and
$R^2$ is alkoxyl or acyloxyl which may have a substituent containing oxygen or nitrogen.

10. The method of claim 8, wherein
$R^1$ is $C_6$-$C_{18}$ aryl or $C_1$-$C_5$ alkyl which may be substituted by $C_6$-$C_{18}$ aryl; and
$R^2$ is alkoxyl or acyloxyl of 1 to 40 carbon atoms which may have a substituent containing oxygen or nitrogen.

11. The method of claim 8, wherein
m is 0;
$R^1$ is $C_1$-$C_5$ alkyl;
$R^2$ is $C_1$-$C_{40}$ alkoxyl;
$R^3$ is hydrogen or methyl;
$R^4$ is hydrogen or methyl; and
$R^5$ is $C_1$-$C_5$ branched or unbranched alkylene.

12. The method of claim 1, wherein the modified polyvinyl alcohol contains the silicon-containing monomer unit in an amount of 0.01 to 10 mol%.

13. The method of claim 1, wherein the modified polyvinyl alcohol contains the silicon-containing monomer unit in an amount of 0.1 to 3 mol%.

14. The method of claim 1, wherein the modified polyvinyl alcohol has
a degree of polymerization of 100 to 3000, and
a degree of saponification of 70 to 100 mol%.

* * * * *